(12) United States Patent
Miwa

(10) Patent No.: US 9,942,414 B2
(45) Date of Patent: Apr. 10, 2018

(54) DIGITAL SMART SECURITY NETWORK SYSTEM, METHOD AND PROGRAM

(71) Applicant: TECHNOMIRAI Co., Ltd., Tokyo (JP)

(72) Inventor: Kazuo Miwa, Tokyo (JP)

(73) Assignee: TECHNOMIRAI CO., LTD., Tokyo (JP)

( * ) Notice: Subject to any disclaimer, the term of this patent is extended or adjusted under 35 U.S.C. 154(b) by 114 days.

(21) Appl. No.: 14/412,952

(22) PCT Filed: Oct. 22, 2012

(86) PCT No.: PCT/JP2012/077265
§ 371 (c)(1),
(2) Date: Jan. 5, 2015

(87) PCT Pub. No.: WO2014/006772
PCT Pub. Date: Jan. 9, 2014

(65) Prior Publication Data
US 2015/0179039 A1      Jun. 25, 2015

(30) Foreign Application Priority Data

Jul. 5, 2012 (WO) .................. PCT/JP2012/067242

(51) Int. Cl.
*G08B 21/04* (2006.01)
*H04M 11/04* (2006.01)
(Continued)

(52) U.S. Cl.
CPC .......... *H04M 11/04* (2013.01); *G08B 25/001* (2013.01); *G08B 25/006* (2013.01);
(Continued)

(58) Field of Classification Search
None
See application file for complete search history.

(56) References Cited

U.S. PATENT DOCUMENTS 5,990,793 A * 11/1999 Bieback ................. A62B 18/08
2/5
6,000,395 A * 12/1999 Brown ............... A41D 13/0051
128/201.29
(Continued)

FOREIGN PATENT DOCUMENTS

| CN | 1175867 A | 3/1998 |
| CN | 1577354 A | 2/2005 |

(Continued)

OTHER PUBLICATIONS

International Search Report isssued in Application PCT/JP2012/077265, dated Dec. 11, 2012.
(Continued)

*Primary Examiner* — Quan-Zhen Wang
*Assistant Examiner* — Chico A Foxx
(74) *Attorney, Agent, or Firm* — Michael Best & Friedrich LLP

(57) ABSTRACT

Provided are a digital smart security system and method and a program that allow reporting the occurrence of an abnormal situation in security, even in front of a suspicious person, without the suspicious person's awareness. The digital smart security system comprises an abnormality determination unit (112) that, when breathing detected by a respiration sensor (10) for detecting a user's breathing has a preset breathing pattern in which breathing stops for a predetermined period of time and resumes, determines it to be the occurrence of an abnormal situation, and an alarm sending unit (203) that reports the abnormal situation based on the determination result as being the occurrence of an abnormal situation. The abnormality determination unit (112), if the user has stopped breathing for a certain period of time (for example, 10 to 15 seconds) and has resumed breathing, determines it to be the occurrence of an abnormal situation. On the other hand, the abnormality determination
(Continued)

unit (112), if breathing has stopped and does not resume, determines that an abnormal situation in health of the user has occurred.

5 Claims, 12 Drawing Sheets

(51) Int. Cl.
G08B 25/08 (2006.01)
H04W 4/22 (2009.01)
H04W 64/00 (2009.01)
H04W 76/00 (2018.01)
G08B 25/00 (2006.01)
G08B 25/01 (2006.01)
H04W 4/02 (2018.01)
H04W 4/00 (2018.01)

(52) U.S. Cl.
CPC ........... *G08B 25/016* (2013.01); *G08B 25/08* (2013.01); *H04W 4/22* (2013.01); *H04W 64/00* (2013.01); *H04W 76/007* (2013.01); *G08B 21/043* (2013.01); *G08B 21/0453* (2013.01); *H04W 4/008* (2013.01); *H04W 4/02* (2013.01); *H04W 4/023* (2013.01)

(56) References Cited

U.S. PATENT DOCUMENTS

| | | | | |
|---|---|---|---|---|
| 8,260,405 | B2* | 9/2012 | Aarts | A61B 5/021 600/377 |
| 8,855,729 | B1* | 10/2014 | Pattikonda | H04B 1/385 455/550.1 |
| 8,988,214 | B2* | 3/2015 | Altman | G06F 19/3418 340/539.11 |
| 9,002,427 | B2* | 4/2015 | Tupin, Jr. | A61B 5/0507 600/407 |
| 2002/0035576 | A1* | 3/2002 | Kishimoto | H04L 51/066 |
| 2004/0243005 | A1* | 12/2004 | Rapps | A61B 5/0002 600/481 |
| 2005/0001720 | A1* | 1/2005 | Mason | G01C 21/206 340/539.13 |
| 2005/0001727 | A1 | 1/2005 | Terauchi et al. | |
| 2006/0158329 | A1* | 7/2006 | Burkley | H04W 4/22 340/539.13 |
| 2007/0156840 | A1 | 7/2007 | Bashford et al. | |
| 2007/0282173 | A1* | 12/2007 | Wang | A61B 5/1112 600/300 |
| 2009/0076397 | A1* | 3/2009 | Libbus | A61B 5/6833 600/484 |
| 2009/0226043 | A1* | 9/2009 | Angell | G08B 21/0476 382/115 |
| 2009/0322513 | A1* | 12/2009 | Hwang | A61B 5/02055 340/539.12 |
| 2010/0315228 | A1* | 12/2010 | Grilliot | G08B 21/04 340/540 |
| 2011/0156915 | A1* | 6/2011 | Brauers | A61B 5/02 340/573.4 |
| 2011/0319051 | A1* | 12/2011 | Reitnour | G01S 19/17 455/404.2 |
| 2012/0123277 | A1* | 5/2012 | Blaha | G06K 9/00067 600/476 |
| 2012/0316458 | A1* | 12/2012 | Rahman | A61B 5/0008 600/549 |
| 2014/0240124 | A1* | 8/2014 | Bychkov | A61B 5/0026 340/539.12 |
| 2015/0173654 | A1* | 6/2015 | Belanger | A61B 5/1117 600/301 |
| 2015/0201846 | A1* | 7/2015 | Maiershon | A61B 5/0205 600/301 |
| 2016/0094700 | A1* | 3/2016 | Lee | H04W 8/245 455/419 |
| 2016/0119424 | A1* | 4/2016 | Kane | G08B 27/001 709/203 |
| 2016/0322078 | A1* | 11/2016 | Bose | G11B 27/031 |

FOREIGN PATENT DOCUMENTS

| | | |
|---|---|---|
| CN | 101120390 A | 2/2008 |
| EP | 0 825 751 A2 | 2/1998 |
| JP | H09-305877 A | 11/1997 |
| JP | 2004-054570 A | 2/2004 |
| JP | 2007-506158 A | 3/2007 |
| JP | 3131971 U | 5/2007 |
| JP | 2008-503268 A | 2/2008 |
| JP | 2012-059002 A | 3/2012 |
| JP | 2012-113446 A | 6/2012 |
| WO | WO-95/30369 A1 | 11/1995 |
| WO | WO-2005/027071 A1 | 3/2005 |
| WO | WO-2006/009830 A2 | 1/2006 |
| WO | WO-2011/138794 A1 | 10/2011 |

OTHER PUBLICATIONS

Office Action issued in Chinese Application No. 201280074509.X, dated Feb. 29, 2016.
Extended Search Report issued in European Application No. 12880567.8, dated Jul. 21, 2015.

* cited by examiner

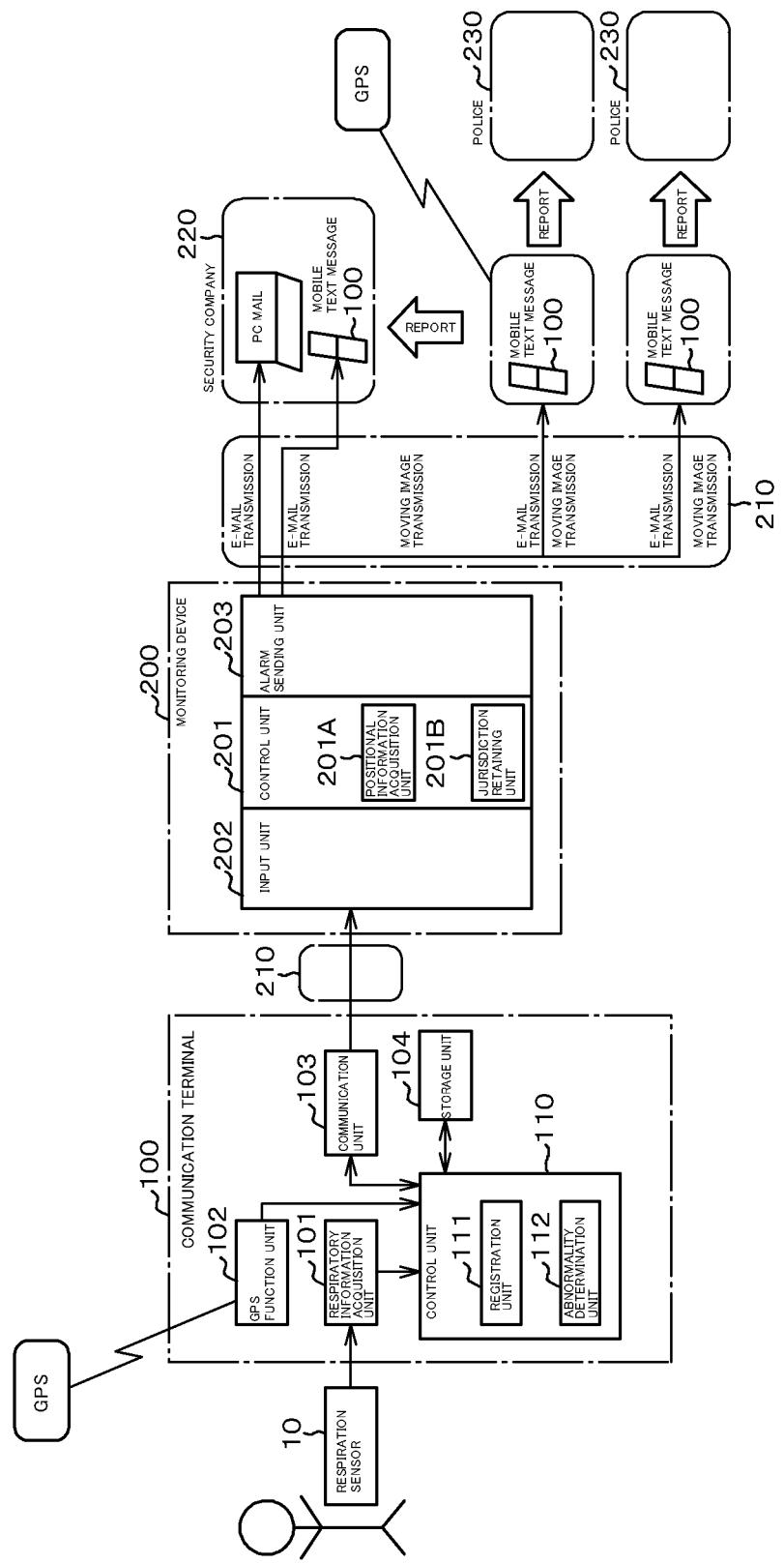

FIG. 2

REGISTRATION SETTING INFORMATION          120

| USER:A  ⦿ | USER: A<br>RESPIRATION SENSOR A<br>NAME<br>MOBILE PHONE NUMBER<br>NORMAL-TIME RESPIRATORY INFORMATION | MOBILE TERMINAL A<br>NAME<br>RESPIRATION SENSOR NUMBER<br>DS2 INFORMATION<br>NORMAL-TIME RESPIRATORY INFORMATION<br>BREATHING STOP PATTERN PROGRAM |
|---|---|---|
| USER:B  ⦿ | USER: B<br>RESPIRATION SENSOR B<br>NAME<br>MOBILE PHONE NUMBER<br>NORMAL-TIME RESPIRATORY INFORMATION | MOBILE TERMINAL B<br>NAME<br>RESPIRATION SENSOR NUMBER<br>DS2 INFORMATION<br>NORMAL-TIME RESPIRATORY INFORMATION<br>BREATHING STOP PATTERN PROGRAM |
| USER:C  ⦿ | RESPIRATION SENSOR C<br>NAME<br>MOBILE PHONE NUMBER<br>NORMAL-TIME RESPIRATORY INFORMATION | MOBILE TERMINAL C<br>NAME<br>RESPIRATION SENSOR NUMBER<br>DS2 INFORMATION<br>NORMAL-TIME RESPIRATORY INFORMATION<br>BREATHING STOP PATTERN PROGRAM |

FIG. 13

| USER | NORMAL RESPIRATION | ABNORMAL STATE | PERIOD TO INTENTIONALLY STOP BREATHING PERIOD SET BY INDIVIDUAL | BREATHING STOP PATTERN | EMERGENCY STATE |
|---|---|---|---|---|---|
| USER A | NORMAL RESPIRATION | i. ATTENTION<br>ii. ABNORMAL SITUATION<br>iii. EMERGENCY STATE | 5 SECONDS<br>10 SECONDS<br>15 SECONDS | REPEAT THE BREATHING STOP PERIODS FOR i~iii 1 TO 2 TIMES TO INCREASE SENSITIVITY, AND ACCURATELY TRANSMIT THE ABNORMAL SITUATION IN REAL TIME TO THE CORPORATE HEADQUARTERS, SECURITY COMPANY, AND FAMILY | IN THE CASE OF A THREAT, THE FEAR CAUSES BREATHING TO STOP MOMENTARILY, AND RESPIRATION THEN VARIES. USER A'S RESPIRATION SENSOR SIGNALS ARE TRANSMITTED TO USER A'S MOBILE TERMINAL, AND THE MOBILE TERMINAL CHECKS WITH USER A'S BREATHING STOP PROGRAM, AND SENDS AN EMERGENCY TRANSMISSION TO THE CORPORATE HEADQUARTERS AND FAMILY NOTIFYING THAT USER A IS IN AN EMERGENCY. |
| ... | | | | | |
| USER Z | | | | | |

DIGITAL SMART SECURITY NETWORK SYSTEM, METHOD AND PROGRAM

TECHNICAL FIELD

The present invention relates to a digital smart security system and method that allow reporting an abnormal situation in security, even in front of a suspicious person, without the suspicious person's awareness.

BACKGROUND ART

Service operations such as stores including department stores, supermarkets, and convenience stores, banks, company offices, air terminals, money exchangers, cash transport trucks, buses, and taxies have been handling financial paper, cash, and/or commodities. Their customers include not only well-intentioned persons but also those having criminal intent, so that there is a high risk of crime victimization along with operating activities.

In an emergency, it is common that the victim notifies the emergency situation to his/her family, corporate concerned person, the police, and/or the like and waits for help. However, the victim threatened by the perpetrator is restricted from any actions, which leads to trouble or an incident in many cases.

Patent Literature 1 describes a security system that makes abnormality in a switching operation recoverable at a stage the abnormality in a switching operation by an operator has been detected. In the security system described in Patent Literature 1, a control device that detects and reports abnormality in a monitoring area stores identification information assigned to users and identification information assigned to an administrator associated with e-mail addresses respectively, accepts a switching operation for the setting of a security mode, and creates and transmits an e-mail message including a specified e-mail address according to these judgment results.

CITATION LIST

Patent Literature

[Patent Literature 1] JP 2012-113446 A
[Patent Literature 2] JP 2008-503268 A
[Patent Literature 3] JP 2007-506158 A

SUMMARY OF INVENTION

Technical Problem

When an intruder(s) enters a store, and threatens its employee(s) and demands money and/or goods, the employee may hand over money and/or goods for his/her own safety to be robbed. Because the threatener(s) carrying a weapon(s) is standing in front of him/her, the employee(s) may not even be able to perform a reporting act to an emergency reporting device, a report to police, or a counterattack to the threatener(s) for customer and personal safety, or conversely, the threatener may attack the employee(s) and/or a store user(s) to cause an incident.

Also, as anticrime measures, there have been provided crime prevention methods of, when an intruder having broken into a store and building threatens its employee (s) or family, the employee or family pushing an abnormality switch to report to its security company or corporate headquarters or of installing an alarm lamp, a speaker, and/or the like outside the building, and informing in that case a third party outside the building of the abnormality, however, such crime prevention methods are not yet perfect.

It is an object of the present invention to provide a digital smart security system and method and a program that allow a victim to reliably report the occurrence of an abnormal situation.

Solution to Problem

A digital smart security system according to the present invention comprises respiratory information acquiring means for acquiring respiratory information from a respiration sensor for detecting breathing of personnel to which the respiratory information acquiring means is fitted; abnormality determining means for determining whether it is abnormality, based on the respiratory information, depending on whether breathing stops for a predetermined period of time and resumes; and control means for reporting an abnormal situation in response to the abnormality determining means having determined that it is an abnormal situation.

Also, the abnormality determining means determines that it is security abnormality, based on the respiratory information, if breathing stops for a predetermined period of time and resumes, and determines that it is personnel's health abnormality, if breathing stops and doesn't resume, and the control means makes different reports between the security abnormality and health abnormality, which allows reporting security abnormality and personnel's health abnormality in a distinguishing manner.

Also, the abnormality determining means determines that it is different abnormality, based on the respiratory information, in response to which period of a plurality of predetermined periods breathing stops and resumes, and the control means makes a different report in response to the different abnormality, which allows making a detailed report according to the details or degree of an abnormal situation.

Also, the abnormality determining means determines that it is different abnormality, based on the respiratory information, in response to which period of a plurality of predetermined periods breathing stops and resumes, and the control means makes a different report in response to the different abnormality, and the digital smart security system comprises positional information acquiring means for detecting existing positions of a plurality of communication terminals, and acquiring positional information of the communication terminals; and jurisdiction retaining means for retaining a jurisdictional district for receiving an emergency telephone call where a building under security exists, wherein the control means refers to the jurisdiction retaining means in response to the abnormality determining means having determined that it is an abnormal situation, and if any of the plurality of communication terminals exists in the jurisdictional district, reports preferentially to the communication terminal existing in the jurisdictional district, which allows promptly reporting when an emergency call is made from a mobile phone.

Also, the reporting means transmits an e-mail message and an image, which allows a person having received a report to assess the abnormal situation accurately and promptly.

A digital smart security method according to the present invention comprises a respiratory information acquiring step of acquiring respiratory information from a respiration sensor for detecting breathing of personnel to which the respiratory information acquiring means is fitted; an abnormality determining step of determining whether it is abnormality, based on the respiratory information, depending on whether breathing stops for a predetermined period of time and resumes; and a control step of reporting an abnormal situation in response to the abnormality determining means having determined that it is an abnormal situation.

The present invention is a program for causing a computer to function as a digital smart security system including respiratory information acquiring means for acquiring respiratory information from a respiration sensor for detecting breathing of personnel to which the respiratory information acquiring means is fitted, abnormality determining means for determining whether it is abnormality, based on the respiratory information, depending on whether breathing stops for a predetermined period of time and resumes, and control means for reporting an abnormal situation in response to the abnormality determining means having determined that it is an abnormal situation.

Advantageous Effects of Invention

The present invention allows reporting the occurrence of an abnormal situation in security, even in front of a suspicious person, without the suspicious person's awareness.

BRIEF DESCRIPTION OF DRAWINGS

FIG. 1 is a block diagram showing a configuration of a digital smart security system according to a first embodiment of the present invention.

FIG. 2 is a chart showing registration setting information of respiration sensors and communication terminals of the digital smart security system according to the first embodiment of the present invention.

FIG. 13 is a chart showing an example of a breathing stop pattern of a digital smart security system according to a third embodiment of the present invention.

DESCRIPTION OF EMBODIMENTS

Figure 3:
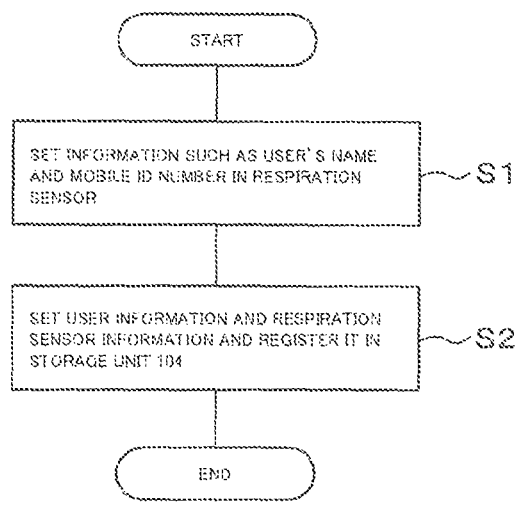
FIG. 3 is a flowchart showing a registration processing of the respiration sensor and communication terminal of the digital smart security system according to the first embodiment of the present invention.

Hereinafter, modes for carrying out the present invention will be described in detail with reference to the accompanying drawings.

(First Embodiment)

FIG. 1 is a block diagram showing a configuration of a digital smart security system according to a first embodiment of the present invention.

The present digital smart security system comprises a communication terminal 100 that is worn on a user (personnel) and capable of receiving respiratory information from a respiration sensor 10 for detecting human respiration to output respiratory information, and a monitoring device 200 being a main body of digital smart security system equipment that communicates with the communication terminal 100 via a telephone line 210.

In addition, when the digital smart security system provides services of a security contract to the communication terminals 100, users of the communication terminals 100 can be referred to as users from the viewpoint of the digital smart security system.

Also, depending on the intended use, the configuration may be such that the monitoring device 200 is incorporated into the communication terminal 100, but in the present embodiment, description will be given of a configuration for which the communication terminal 100 and the monitoring device 200 are separated.

The communication terminals 100 consist of mobile phones, PHS (Personal Handy-Phone System) phones, PDAs (Personal Digital Assistants), smartphones, or the like, and transmit a sound transmission and a repelling device operating command to the monitoring device 200 via the telephone line 210. In the present embodiment, mobile phones or smartphones are used as the communication terminals 100, and each individual can use the same at a variety of locations (that is, current position). One of the communication terminals 100 is disposed at a security company 220 together with a PC (Personal Computer). The communication terminal 100 is capable of receiving an e-mail message, an image including a moving image, or the like from the monitoring device 200 via the telephone line 210.

[Respiration Sensor 10]

The respiration sensor 10 captures movements of the body surface due to respiration. Although not being the subject of the present invention, the respiration sensor 10 will be described for the sake of understanding the present invention. The respiration sensor 10 senses respiration (whether the respiratory rate is high or low, breathing or not) based on minute body movements, for example, using a microwave Doppler sensor, by microwaves (2.4 GHz) sent from the sensor. The respiration sensor 10, using an adhesive sensor having a built-in acoustic transducer as another example, distinguishes between air flows (inhalation and expiration) in the respiratory tract to detect the respiratory rate successively. The respiratory information acquired by the respiration sensor 10 is output to the communication terminal 100 which is the subject of the present invention according to a wireless communication system.

[Communication Terminal 100]

The communication terminal 100 is configured including a respiratory information acquisition unit 101 that acquires respiratory information from the respiration sensor 10, a GPS (Global Positioning System) function unit 102, a communication unit 103, a storage unit 104, and a control unit 110 that controls the communication terminal as a whole.

The respiratory information acquisition unit 101 acquires respiratory information detected by the respiration sensor 10 wirelessly or by a wire. Examples of the wireless communication system are Bluetooth (registered trademark), Wi-Fi radio including IEEE802.11b standards, specified low power radio, ultra-wideband transmission systems such as UWB (Ultra Wide Band), and infrared communication.

The GPS function unit 102 receives radio waves of positional information from a GPS satellite or the like. The GPS function unit 102 calculates, from information received via a GPS antenna, current positional information as two parameters of the latitude and longitude to acquire positional information. In general, altitude information can also be acquired by the GPS, but is not used in the present embodiment. Moreover, current positional information of the communication terminal 100 can also be acquired by performing transmission/reception of information with a mobile phone company server via a base station and network used in place of the GPS function unit 102 or in combination therewith. The acquired positional information is transmitted on a timely basis to the monitoring device 200.

Similar to an ordinary communication terminal, the communication unit 103 performs transmission/reception with a base station. In the present embodiment, the communication terminal 100, to the monitoring device 200 via the communication unit 103, transmits positional information of the communication terminal 100 every certain period of time, and transmits notification of the occurrence of abnormality and the latest positional information on the occurrence of an abnormal situation.

The storage unit 104 is formed by a nonvolatile memory such as an EEPROM, and holds information even after the main body is powered off. The storage unit 104 stores ID information of its own terminal, registration setting information (refer to FIG. 2) to acquire respiratory information from the respiration sensor 10, and a breathing stop pattern program to determine the occurrence of abnormality.

The control unit 110 is formed by a CPU or the like, and performs control of the communication terminal 100 as a whole, and performs control to determine the occurrence of an abnormal situation and reports the abnormal situation.

The control unit 110 includes a registration unit 111 that registers registration setting information to acquire respiratory information, and an abnormality determination unit 112 that, when breathing detected by the respiration sensor 10 has a preset breathing pattern, determines it to be the occurrence of an abnormal situation.

The registration unit 111 and the abnormality determination unit 112 are programs. In the following, when the subject is described as "the XX unit," the CPU reads out a breathing stop pattern program from the storage unit 104 as needed and then loads the same in a main storage unit (not shown), and executes respective functions (described later). The breathing stop pattern program may be stored in advance in the storage unit 104, or may be taken into the communication terminal 104 when necessary via another storage medium or communication medium.

[Monitoring Device 200]

The monitoring device 200 comprises a control unit 201, an input unit 202, and an alarm sending unit 203. The monitoring device 200 may be a common server computer, a personal computer, or the like.

The control unit 201 is formed by a CPU or the like, and controls the device as a whole and executes a security program to function as a digital smart security system. The control unit 201 has a memory (not shown) to store information. A semiconductor memory, a magnetic recording device, an optical disk device, a magneto-optical disk drive device, or the like can be the memory.

The control unit 201 comprises a positional information acquisition unit 201a that tracks an existing position of the communication terminal 100 serving as an information addressee, and acquires positional information of the communication terminal 100, and a jurisdiction retaining unit 201b that retains a police jurisdictional district where a mobile phone exists. Here, the police jurisdictional districts to receive mobile phone calls are on a prefecture-by-prefecture basis in Japan. The control unit 201, when having detected an emergency situation, performs control to specify a communication terminal 100 serving as an information addressee that exists in the police jurisdictional district where the communication terminal 100 serving as an information addresser with reference to the jurisdiction retaining unit 201b, and to report preferentially to the specified communication terminal 100.

The control unit 201 judges a sound transmission (warning to an intruder) and a repelling device operating command transmitted from the communication terminal 100 having received a report, and if these commands are as such, can even output a sound signal to a speaker (not shown) via the input unit 202, and output an operation signal to a repelling device (not shown).

The input unit 202 has a function as an abnormal situation detecting means that detects an abnormal situation based on an abnormality determination result from the communication terminal 100 serving as an information addresser. The input unit 202 receives positional information of the respective communication terminals 100 transmitted from the communication terminal 100 via the telephone line 210, and outputs these signals to the control unit 201.

The alarm sending unit 203 transmits an e-mail message or an image including a moving image to other communication terminals 100 and the security company 140 via the telephone line 210.

The security company 220, when having received an e-mail message, an image, or the like from the present digital smart security system, performs investigation on the abnormal situation. In addition, the security company 220 is not an essential structural element of the digital smart security system according to the present embodiment.

FIG. 2 is a chart showing registration setting information of the respiration sensors 10 and the communication terminals 100.

As shown in FIG. 2, the storage unit 104 of the communication terminal 100 has stored registration setting information 120 that is referred to when a breathing stop pattern program is executed. As the registration setting information 120, respiratory information of the respiration sensor 10 and the communication terminal 100 are set, for each user of the present system, associated with each other. This registration setting information 120 is in advance transferred to the monitoring device 200 and registered in the monitoring device 200, and also in the monitoring device 200, respiratory information of the communication terminal 100 of each user of the present system can be referred to.

For the registration setting information 120, the respiration sensor 10 and the communication terminal 100 are correlated with each other for each user. Specifically, the user's name, mobile phone number, and normal-time respiratory information are items on the side of the respiration sensor 10, and the user's name, respiration sensor number, monitoring device 200 (DS2) information, and normal-time respiratory information are for the communication terminal 100. Also, in the storage unit 104, a breathing stop pattern program is registered. The breathing stop pattern program is registered in the communication terminal 100 and the monitoring device 200 respectively.

Hereinafter, the operation of the digital smart security system configured as described above will be described.

[Registration Processing]

First, a registration processing of the respiration sensor 10, the communication terminal 100, and the monitoring device 200 will be described.

FIG. 3 is a flowchart showing a registration processing of the respiration sensor 10 and the communication terminal 100. The present flow is executed mainly by the registration unit 111 (FIG. 1) of the control unit 110 of the communication terminal 100.

In step S1, the user sets information such as the user's name and the mobile phone number of the communication terminal 100 to which detected respiratory information is transmitted in the respiration sensor 10.

In step S2, the registration unit 111 sets user information (name, gender, age) and respiration sensor information by a pairing operation using a wireless communication system such as Bluetooth or specified low power radio with the respiration sensor 10, and registers the information in the storage unit 104 as registration setting information 120 (refer to FIG. 2). It is preferable to have stored the type of business of users to which the present system is mainly applied as the above-described user information, besides basic information such as the name, gender, and age, in order to enhance effectiveness in the case of security by the digital smart security system.

Next, a registration processing of the respiration sensor 10, the communication terminal 100, and the monitoring device 200 will be described.

Figure 4:
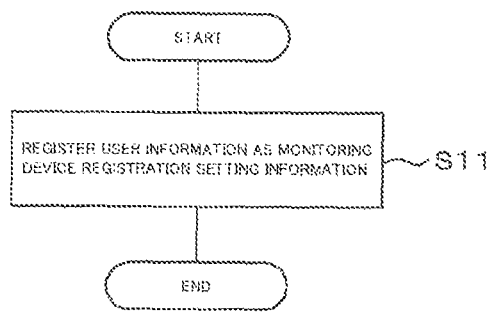
FIG. 4 is a flowchart showing a registration processing of a monitoring device of the digital smart security system according to the first embodiment of the present invention.

FIG. 4 is a flowchart showing a registration processing of the monitoring device 200 (FIG. 1). The present flow is executed mainly by the control unit 201 of the monitoring device 200.

In step S11, the control unit 201 registers user information transmitted from the communication terminal 100, in advance, as monitoring device registration setting information (not shown). As the monitoring device registration setting information, user information of the respiration sensor 10 correlated with the communication terminal 100, the mobile phone number of the communication terminal, the name, a password, a contact address, and a normal respiratory rate (normal-time respiratory information) are registered. Also, a breathing stop pattern program is registered.

[Terminal Monitoring Control]

Next, monitoring control of the communication terminal 100 of the digital smart security system will be described.

Figure 5:
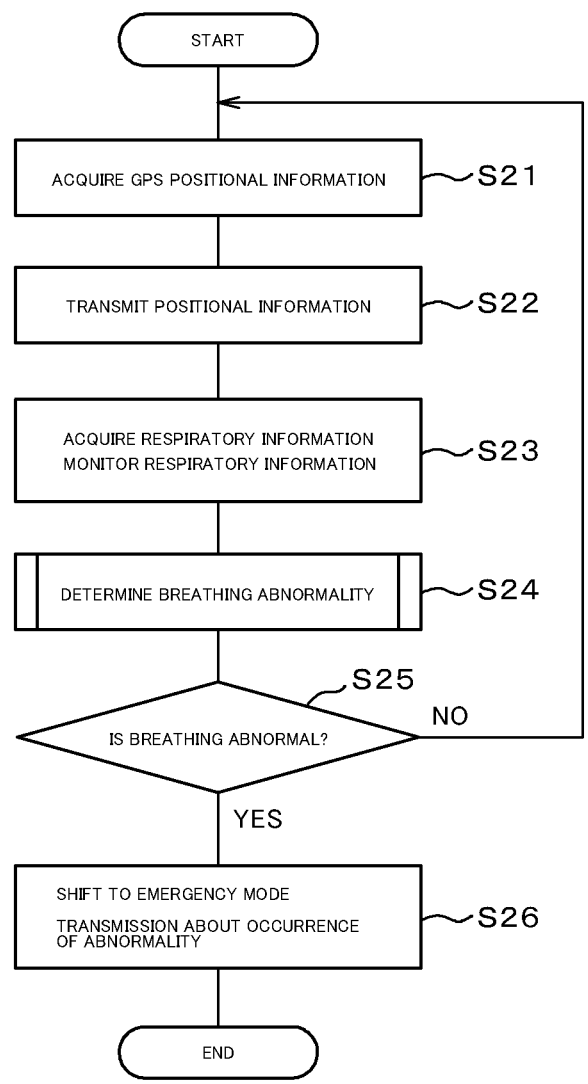
FIG. 5 is a flowchart showing a monitoring control processing of a communication terminal of the digital smart security system according to the first embodiment of the present invention.

FIG. 5 is a flowchart showing a monitoring control processing of the communication terminal 100 of the digital smart security system. The present flow is executed mainly by the control unit 110 (FIG. 1) of the communication terminal 100.

First, in step S21, the GPS function unit 102 acquires current positional information of the communication terminal 100.

In step S22, the control unit 110 transmits acquired positional information of the communication terminal 100 via the communication unit 103 to the monitoring device 200 every predetermined time (for example, one hour). The control unit 201 of the monitoring device 200 receives the positional information from the communication terminal 100 by the input unit 202. The monitoring device 200 can thereby be informed of the latest positional information of the communication terminal 100, for example, every one hour. In the present embodiment, it is assumed that the user carries the respiration sensor 10 and the communication terminal 100 with him/her. Therefore, the monitoring device 200 can be informed of the current position of the user that uses the respiration sensor 10. In addition, if system resources allow, a position closer to the current position can be informed by setting the above-described predetermined time to, for example, every 10 minutes. Alternatively, there may be a mode of changing the above-described predetermined time according to the degree of emergency, necessity, or importance. Here, the positional information of the user (communication terminal 100) is an example of a more preferred embodiment of a digital smart security system, and is not essential. That is, it suffices that an abnormal change in the user based on a user's breathing stop pattern can be determined using the respiration sensor 10 on the side of the monitoring device 200. There is a unique effect that an abnormal change in the user can be informed without the attacker's awareness or the like. However, if not only informing an abnormal change in a user but the current position of said user (communication terminal 100) can also be informed, a more appropriate response can be taken.

In step S23, the respiratory information acquisition unit 101 acquires at all times respiratory information of the user's respiration sensor 10, and the control unit 110 monitors the acquired user's respiratory information.

In step S24, the control unit 110 starts the breathing stop pattern program, and determines abnormality in user's breathing based on the respiratory information. The details of a breathing abnormality determination will be described later according to FIG. 6.

In step S25, the abnormality determination unit 112 determines whether the user's breathing is abnormal (excluding an abnormal situation in health due to a disease or the like), and if the user's breathing is abnormal, the processing shifts to step S26, and if the user's breathing is not abnormal, the processing returns to the above-described step S21.

In step S26, the control unit 110 shifts to an emergency mode to transmit an e-mail message about the occurrence of abnormality to the monitoring device 200 via the communication unit 103 and transmit the latest positional information of the communication terminal 100. In addition, if it takes a long time to acquire the latest positional information of the communication terminal 100 (such as a failure in acquiring GPS positional information) in the emergency mode, it is preferable to be a mode of first causing notification of the occurrence of abnormality without waiting for the acquisition of the latest positional information. Also, the positional information acquired last time may be transmitted.

This allows reliably reporting an abnormal situation by the user's intention without the robber's awareness.

[Breathing Abnormality Determining Processing]

Figure 6:
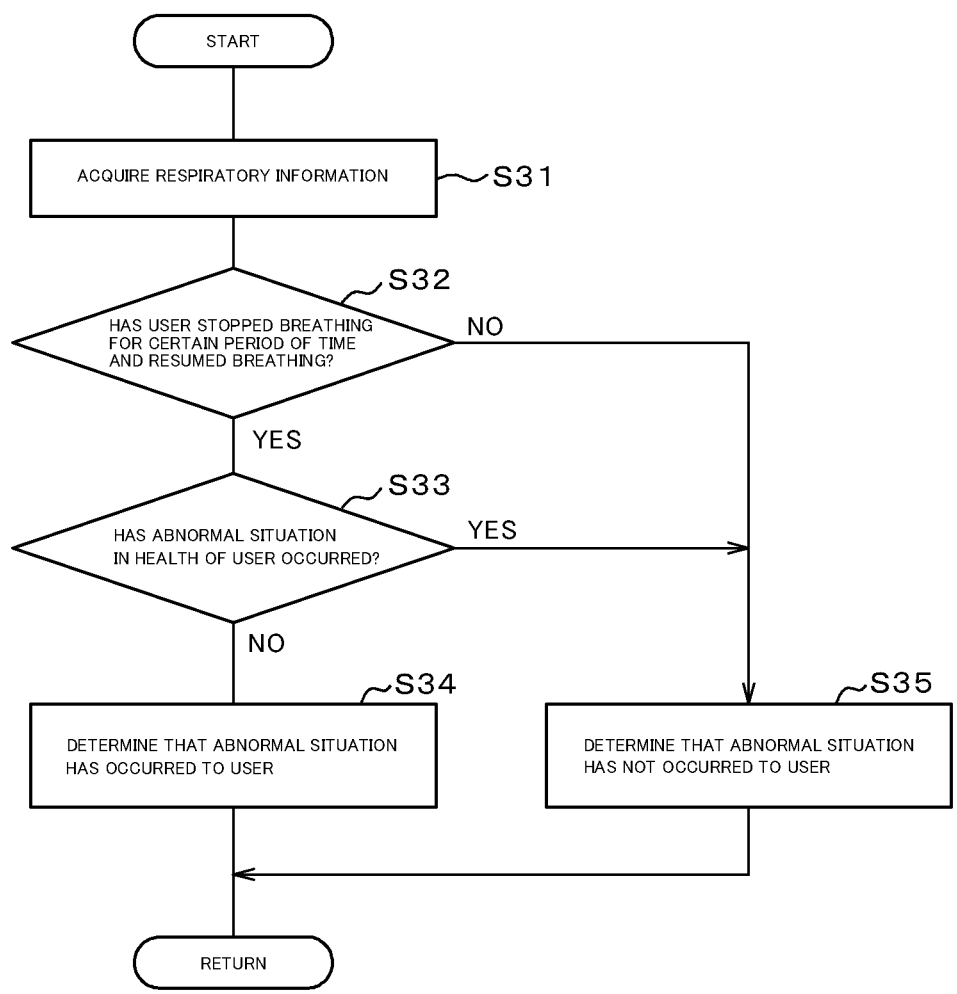
FIG. 6 is a flowchart showing a breathing abnormality determining processing by an abnormality determination unit 112 of the communication terminal of the digital smart security system according to the first embodiment of the present invention.

FIG. 6 is a flowchart showing a breathing abnormality determining processing by the abnormality determination unit 112 of the communication terminal 100, and is a subroutine of step S24 of FIG. 5.

First, in step S31, the respiratory information acquisition unit 101 acquires respiratory information of the user's respiration sensor 10.

In step S32, the abnormality determination unit 112 judges whether the user has stopped breathing for a certain period of time (for example, 10 to 15 seconds) and resumed breathing. Here, the user has been instructed in advance so as to, in the case of the occurrence of an abnormal situation, stop breathing for only the above-described certain period of time and resume breathing. Also, the user has received training for stopping breathing for only the above-described certain period of time and resuming breathing in the case of the occurrence of an abnormal situation, and this training is put into practice when an abnormal situation actually occurs. Examples of the abnormal situation are a convenience store or department store robbery, a bank robbery, a robbery of a bank transport truck, and a jewelry store robbery.

If the user has stopped breathing for a predetermined period of time and resumed breathing, the abnormality determination unit 112 judges in step S33 whether an abnormal situation in health of the user has occurred. A physiological disorder of the respiratory function can be an abnormal situation in health. That is, even when the user has stopped breathing for a predetermined period of time and resumed breathing, if the breathing stop pattern is different from that in the case of the occurrence of an abnormal situation even if only slightly (such that the above-described fixed period of time is slightly different, or the stopping and resuming of breathing are repeated), this case can be regarded as an abnormal situation in health, and is distinguished from an abnormal situation covered by the present system.

If it is determined in the above-described step S33 that an abnormal situation in health of the user has not occurred, the abnormality determination unit 112 determines in step S34 that an abnormal situation has occurred to the user to return to step S24 of FIG. 5.

On the other hand, if the user has not stopped breathing for a certain period of time and resumed breathing in the above-described step S32 or if an abnormal situation in health of the user has occurred in the above-described step S33, the abnormality determination unit 112 determines in step S35 that an abnormal situation in security has not occurred to the user to return to step S24 of FIG. 5.

As above, even when breathing has stopped and resumed, a case due to the occurrence of an abnormal situation in health of the user is excluded, and only an abnormal situation in security covered by the present system is determined.

Also, Patent Literature 2 describes a system for real-time monitoring of physiological data using a physiological parameter that describes an object's respiratory function. Also, Patent Literature 3 describes an apparatus for detecting an emergency situation of an object person's body using stress level information including respiratory rate information. Because the apparatuses described in Patent Literatures 2 and 3 are both for detecting a physiological change that naturally occurs regardless of an object person's intention based on the object person's respiratory rate, it has been difficult to distinguish between the case where the object person has run in urgent need as a part of his/her routine work and has therefore had irregular breathing and the case where the object person has had irregular breathing due to an abnormal situation in security. In contrast thereto, the present digital smart security system is for detecting a physiological change based on an object person's intention, and therefore allows reliably making a report without the suspicious person's awareness only when reporting is truly necessary.

[Report Control of Monitoring Device 200]

<Report Example 1>

Figure 7:
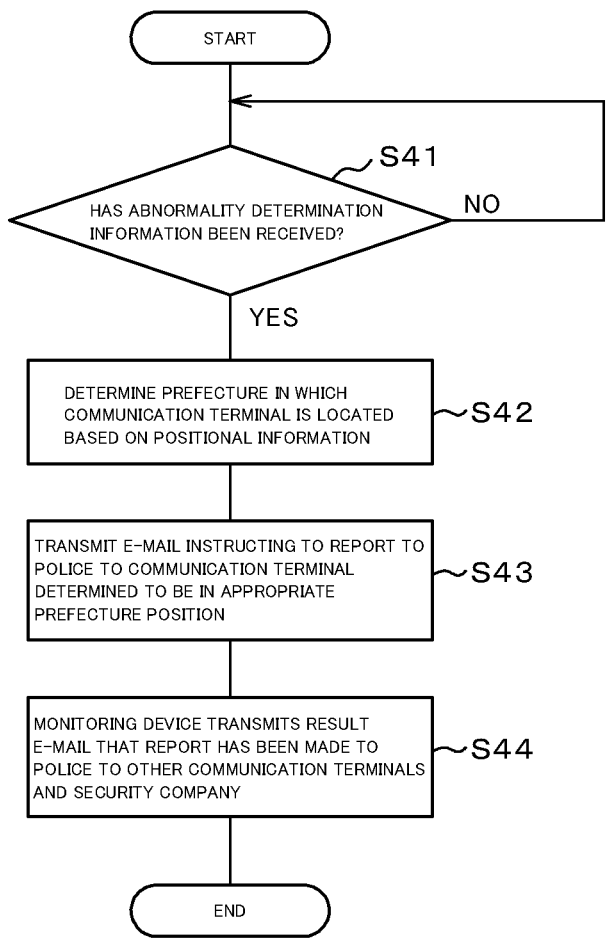
FIG. 7 is a flowchart showing a report control operation of the monitoring device of the digital smart security system according to the first embodiment of the present invention.

FIG. 7 is a flowchart showing a report control operation of the monitoring device 200 of the digital smart security system. The present flow is executed mainly by the control unit 201 (FIG. 1) of the monitoring device 200.

First, in step S41, the control unit 201 waits until the input unit 202 receives abnormality determination information by an e-mail message from the communication terminal 100. Alternatively, it may determine whether abnormality determination information and the latest positional information of the communication terminal 100 have been received. In the present embodiment, the communication terminal 100 is formed by a mobile phone, smartphone, or the like that is capable of mobile communications, and is used at the location (that is, existing position) of each individual. The monitoring device 200 receives normal notification every predetermined time (for example, one hour) to store the position of the communication terminal 100 in normal time where abnormality determination is not notified from the communication terminal 100.

If having received the abnormality determination information from the communication terminal 100, the control unit 201, based on the received positional information of the communication terminal 100, determines said communication terminal 100 is located in which of the prefectures being emergency police reporting telephone call receiving jurisdictional districts in step S42.

In step S43, the control unit 201 transmits an e-mail message instructing to report to a police 230 (refer to FIG. 1) preferentially to a communication terminal 100 determined to be existing in an appropriate prefecture being a jurisdictional district where the building under security exists.

In step S44, the control unit 201 of the monitoring device 200 transmits a result e-mail message that a report has been made to the police 230 to other communication terminals 100 and the security company 220 (refer to FIG. 1) to end the present flow.

As above, the present report example 1 is of reporting preferentially to an information addressee that is in the same police administrative district as the user (victim).

In particular, the present report example 1 is only of reporting to other communication terminals 100, the security company 220, and the police 230, and is intentionally not of carrying out a warning, threat, or the like to the user's (victim's) communication terminal 100. That is, this is for safeguarding the user's (victim's) body without instigating the robber also in consideration of the case where the user (victim) is in such a dangerous situation that he/she cannot even use his/her voice. The present system has a unique effect of being able to reliably report an abnormal situation by the user's intention without the robber's awareness, and the present report example 1 can achieve maximum effect of the present system of reporting an abnormal situation without the robber's awareness.

<Report Example 2>

Report example 2 is an example of application to a building of service operations such as a store, bank, company office, station/air terminal, money exchanger, cash transport truck, bus, or taxi and an individual home (hereinafter, referred to a store or the like).

The above-described store or the like is installed with a plurality of surveillance cameras, and predetermined surveillance regions can be shot. Also, the surveillance cameras may follow a specific person or shooting location. Even if the surveillance cameras don't follow a shooting location, a person and the like can be shot from various angles by installing a plural of the surveillance cameras.

A digital smart security system in a store or the like will be described.

Figure 8:
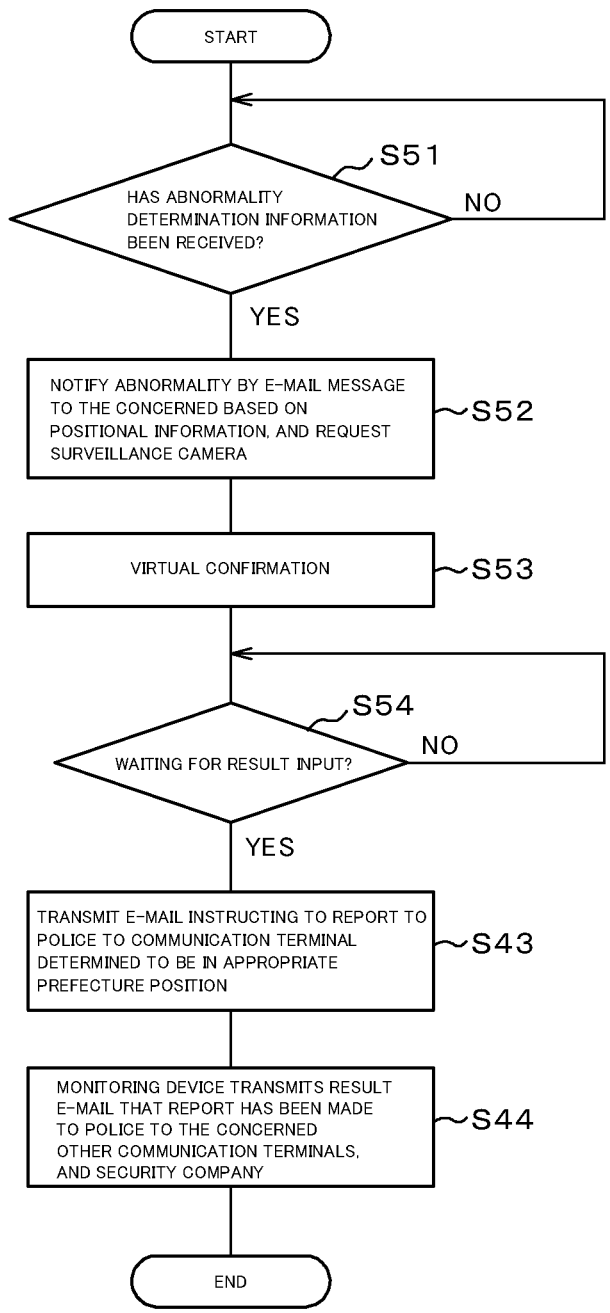
FIG. 8 is a flowchart showing a report control operation of the monitoring device of the digital smart security system according to the first embodiment of the present invention.

FIG. 8 is a flowchart showing a report control operation of the monitoring device 200 of the digital smart security system in a store or the like. The present flow is executed mainly by the control unit 201 (FIG. 1) of the monitoring device 200. The steps that perform the same processing as in FIG. 7 are denoted by the same reference numerals.

First, in step S51, the control unit 201 waits until the input unit 202 receives abnormality determination information by an e-mail message from the communication terminal 100.

If having received the abnormality determination information from the communication terminal 100, the control unit 201, based on the received positional information of the communication terminal 100, notifies the abnormality by an e-mail message to the store office, headquarters, security company, and the like being concerned, and requests to shoot a user concerned by the surveillance cameras in step S52. The store office, headquarters, security company, and the like, based on the user shooting request of the monitoring device 200, take a moving image of the user at the store concerned or the like by the surveillance cameras, and transmit the moving image to the monitoring device 200.

In step S53, the taken real-time moving image of the user is visually confirmed.

In step S54, input of the visual confirmation result by the input unit 202 is waited for.

As a result of the visual confirmation, if the abnormality is confirmed, the control unit 201 transmits an e-mail message instructing to report to a police 230 preferentially to a communication terminal 100 determined to be existing in an appropriate prefecture being a jurisdictional district where the building under security exists in step S43.

In step S44, the control unit 201 of the monitoring device 200 transmits a result e-mail message that a report has been made to the police 230 to the concerned, other communication terminals 100, and the security company 220 to end the present flow.

The present report example 2 is of safeguarding the user's (victim's) body without instigating the robber also in consideration of the case where the user (victim) is in such a dangerous situation that he/she cannot even use his/her voice. The present system is able to reliably report an abnormal situation by the user's intention without the robber's awareness. In particular, because the present report example 2 is of visually confirming a real-time moving image of an environment where the user exists while determining abnormality, a more reliable abnormal determination can be performed, and more appropriate measures can be implemented.

<Report Example 3>

By report examples 1 and 2, an abnormal situation can be reported without the robber's awareness.

Report example 3 is an example of reporting an abnormal situation without the robber's awareness, followed by a threat to the robber.

Figure 9:
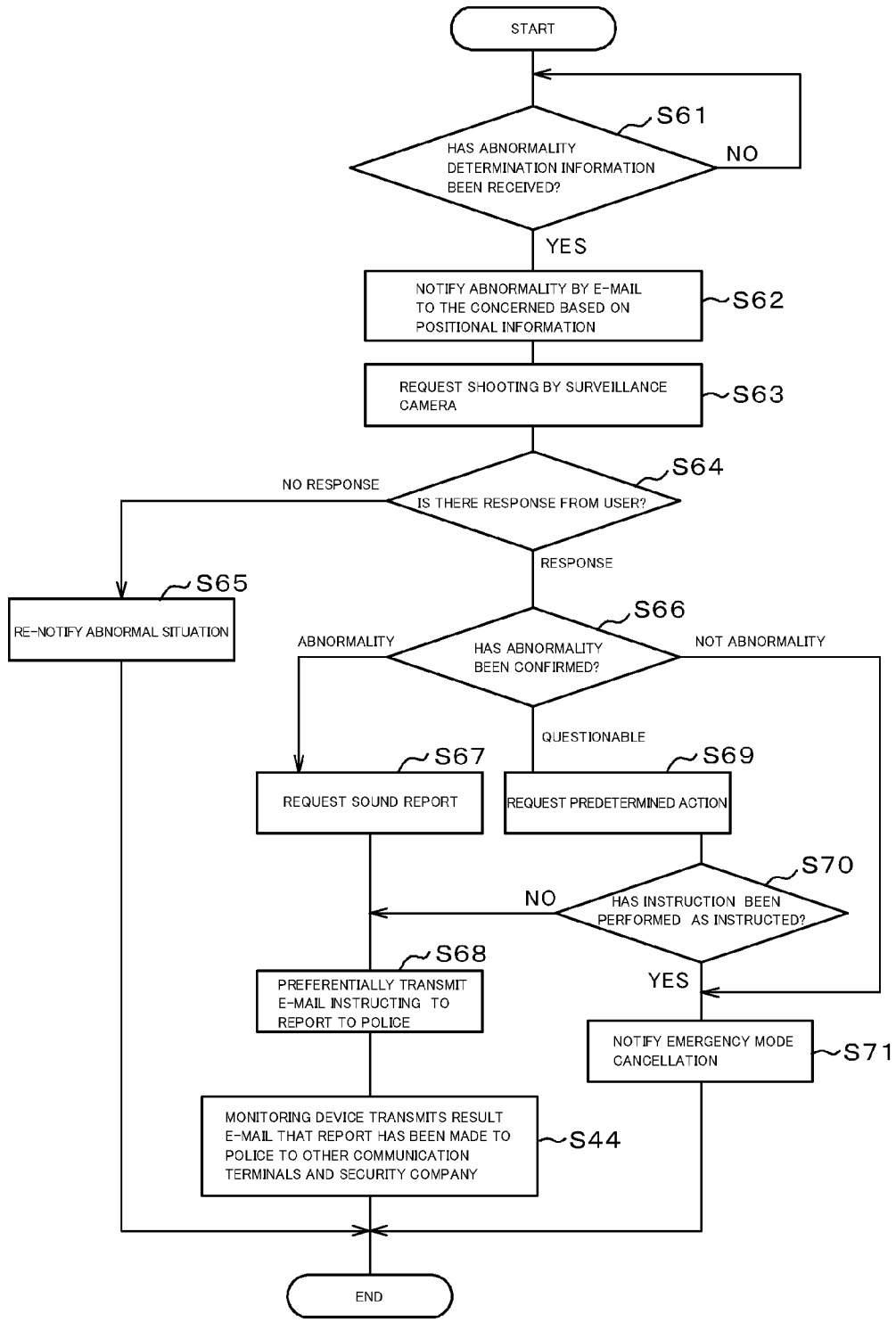
FIG. 9 is a flowchart showing a report control operation of the monitoring device of the digital smart security system according to the first embodiment of the present invention.

FIG. 9 is a flowchart showing a report control operation of the monitoring device 200 of the digital smart security system in a store or the like. The present flow is executed mainly by the control unit 201 (FIG. 1) of the monitoring device 200. The steps that perform the same processing as in FIG. 8 are denoted by the same reference numerals.

First, in step S61, the control unit 201 waits until the input unit 202 receives abnormality determination information by an e-mail message from the communication terminal 100.

If having received the abnormality determination information from the communication terminal 100, the control unit 201, based on the received positional information of the communication terminal 100, notifies the abnormality by an e-mail message to the store office, headquarters, security company, and the like being concerned, and causes the communication terminal 100 of the user to produce a sound to confirm the situation by an automated voice in step S62.

In step S63, the control unit 201 requests to shoot the user by the surveillance cameras. The store office, headquarters, security company, and the like, based on the user shooting request of the monitoring device 200, take a moving image of the user at the store or the like by the surveillance cameras, and transmit the moving image to the monitoring device 200.

In step S64, the control unit 201 determines whether there is a response from the communication terminal 100 of the user in response to the situation confirmation by an automated voice. If there is no response from the user's communication terminal 100, the control unit 201 re-notifies the emergency situation (abnormal situation) to the store or the like being concerned by attaching a photo (s) to an e-mail message in step S65.

If there is a response from the user's communication terminal 100, the real-time moving image of the user taken in step S66 is visually confirmed to determine whether it is abnormality, questionable, or not abnormality.

As a result of the visual confirmation, when it is abnormality, the control unit 201 requests the headquarters of the store or the like to make a sound report to an appropriate place in the store (a place in the store where the user is present) in step S67. The headquarters of the store or the like receives this request to make a threat toward the appropriate place in the store by sound notification (such as a threatening tone or a warning message).

In step S68, the control unit 201, after confirmation of the emergency situation by the headquarters of the store or the like and/or security company, based on the user's position, transmits an e-mail message instructing to report to a police 150 preferentially to a communication terminal 100 determined to be existing in an appropriate prefecture being a jurisdictional district where the building under security exists.

In step S44, the control unit 201 of the monitoring device 200 transmits a result e-mail message that a report has been made to a police 150 to the concerned, other communication terminals 100, and the security company 140 to end the present flow.

As a result of the visual confirmation, if it is questionable, the control unit 201 requests the headquarters of the store or the like to cause the user to take a predetermined action (such as an action to inform that it is not an emergency situation) by a sound in step S69. The headquarters of the store or the like instructs the user to take an appropriate action by a voice message by receiving this request.

In step S70, the control unit 201, based on a response from the headquarters of the store or the like, determines whether the user has performed the action as instructed. If the user has performed the action as instructed, it is judged that it is not abnormality to proceed to step S71, and if the user has not performed the action as instructed, it is judged that it is abnormality to proceed to step S68.

If it is determined that it is not abnormality in the above-described step S66 or if the user has performed the action as instructed, the control unit 201 notifies the user and other communication terminals 100 in step S71 that the emergency mode has been cancelled to end the present flow.

As above, in the present report example 3, the headquarters office of a store having received an abnormal situation confirms a moving image of the surveillance cameras and threatens the robber, and can thereby prevent an incident. Also, the monitoring device 200 detects an abnormal situation, checks a moving image of the surveillance cameras, and threatens the intruder by a speaker. In such a situation that a third party is not involved in trouble, a repelling device (not shown) can be activated to repel the intruder.

<Report Example 4>

Similar to report example 3, report example 4 is an example of reporting an abnormal situation without the robber's awareness, followed by a threat to the robber.

Figure 10:
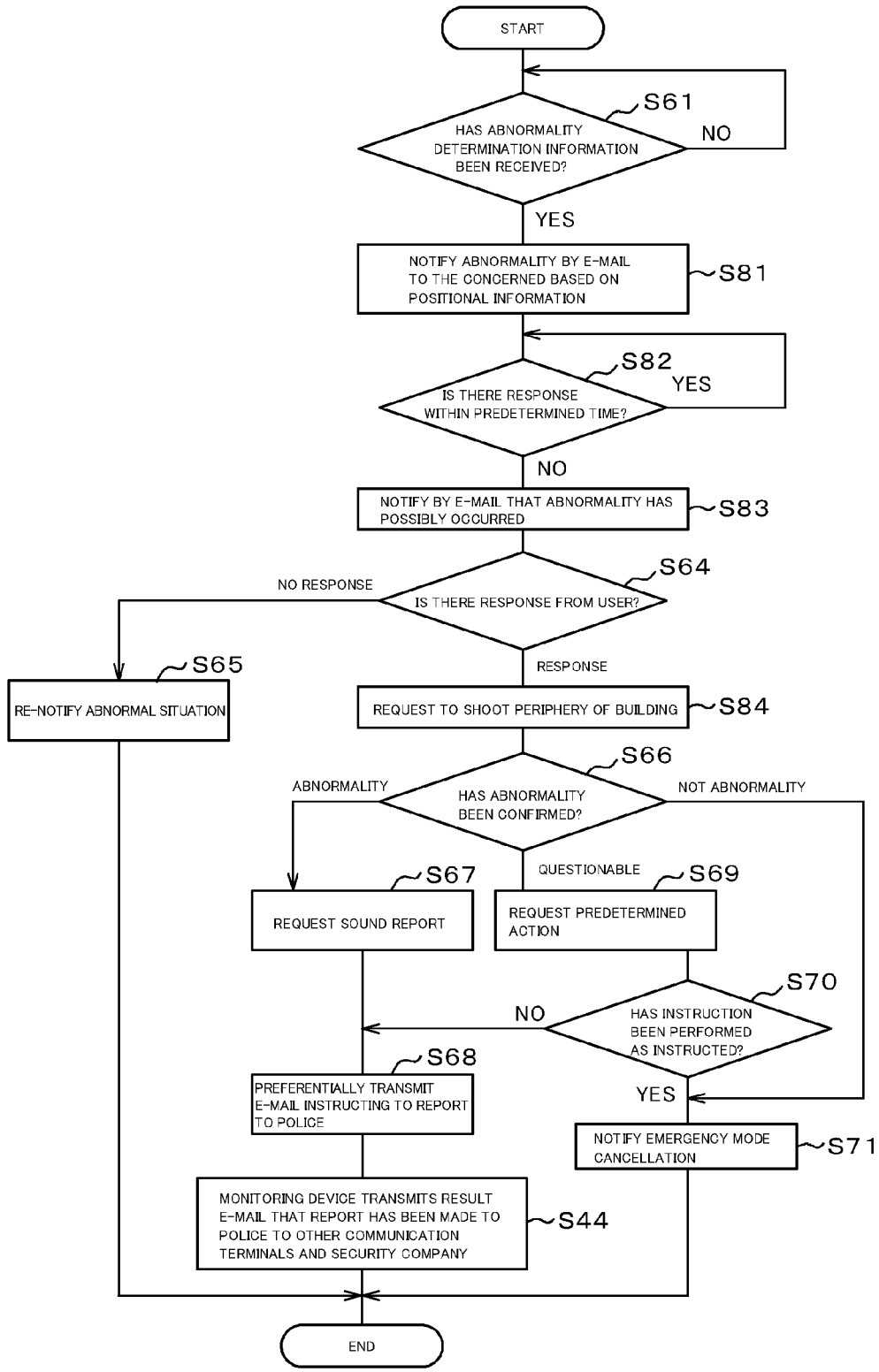
FIG. 10 is a flowchart showing a report control operation of the monitoring device of a corporation or individual of the digital smart security system according to the first embodiment of the present invention.

FIG. 10 is a flowchart showing a report control operation of the monitoring device 200 of the digital smart security system in a corporation or individual. The present flow is executed mainly by the control unit 201 (FIG. 1) of the monitoring device 200. The steps that perform the same processing as in FIG. 9 are denoted by the same reference numerals.

First, in step S61, the control unit 201 waits until the input unit 202 receives abnormality determination information by an e-mail message from the communication terminal 100.

If having received the abnormality determination information from the communication terminal 100, the control unit 201, based on the received positional information of the communication terminal 100, notifies the abnormality by an e-mail message to the family, security company, corporate headquarters, and/or the like being concerned, and causes the communication terminal 100 of the user to produce a sound to confirm the situation by an automated voice in step S81.

In step S82, the control unit 201 issues the above-described e-mail message to the family or corporate headquarters, and then determines whether there is a response to said e-mail message within a predetermined time (for example, three minutes).

If there is no response within a predetermined time (for example, three minutes) even after the above-described e-mail message was issued, the control unit 201 notifies other users (other communication terminals 100) by an e-mail message that abnormality has possibly occurred to the user in step S83.

In step S64, the control unit 201 determines whether there is a response from the communication terminal 100 of the user in response to the situation confirmation by an automated voice. If there is no response from the user's communication terminal 100, the control unit 201 re-notifies the emergency situation to the store or the like being concerned by attaching a photo(s) to an e-mail message in step S65.

In step S84, the control unit 201 requests to shoot the periphery of the building by the surveillance cameras. The store office, headquarters, security company, and the like, based on the user shooting request of the monitoring device 200, take a moving image of the periphery of the building by the surveillance cameras, and transmit the moving image to the monitoring device 200.

The real-time moving image of the user taken in step S66 is visually confirmed to determine whether it is abnormality, questionable, or not abnormality.

As a result of the visual confirmation, if it is abnormality, the control unit 201 requests the headquarters of the store or the like to make a sound report to an appropriate place in the store (a place in the store where the user is present) in step S67. The headquarters of the store or the like receives this request to make a threat toward the appropriate place in the store by sound notification (such as a threatening tone or a warning message).

In step S68, the control unit 201, after confirmation of the emergency situation by the headquarters of the store or the like and/or security company, based on the user's position, transmits an e-mail message instructing to report to a police 150 preferentially to a communication terminal 100 determined to be existing in an appropriate prefecture being a jurisdictional district where the building under security exists.

In step S44, the control unit 201 of the monitoring device 200 transmits a result e-mail message that a report has been made to the police 230 to the concerned, other communication terminals 100, and the security company 220 to end the present flow.

As a result of the visual confirmation, if it is questionable, the control unit 201 requests the headquarters of the store or the like to cause the user to take a predetermined action (such as an action to inform that it is not an emergency situation) by a sound in step S69. The headquarters of the store or the like receives this request, and instructs the user to take an appropriate action by a voice message.

In step S70, the control unit 201, based on a response from the headquarters of the store or the like, determines whether the user has performed the action as instructed. If the user has performed the action as instructed, it is judged that it is not abnormality to proceed to step S71, and if the user has not performed the action as instructed, it is judged that it is abnormality to proceed to step S68.

If it is determined that it is not abnormality in the above-described step S66 or if the user has performed the action as instructed, the control unit 201 notifies the user and other communication terminals 100 in step S71 that the emergency mode has been cancelled to end the present flow.

As above, even in a situation where an employee(s) is threatened by a threatener and cannot take any actions, the monitoring device 200 can report the abnormal situation to the office and headquarters of the store and the security company 220 to call the emergency number 110 (i.e., make an emergency call) to a police 230 in real time, without the threatener's awareness.

As described above in detail, according to the present embodiment, the digital smart security system comprises the respiration sensor 10 for detecting breathing of a user, the abnormality determination unit 112 that, if breathing detected by the respiration sensor 10 has a preset breathing pattern, determines it to be the occurrence of an abnormal situation, and the alarm sending unit 203 that reports an abnormal situation based on a determination result as being the occurrence of an abnormal situation. The abnormality determination unit 112, if the user (communication terminal 100) has stopped breathing for a fixed period of time (for example, 10 to 15 seconds) and resumed breathing, determines it to be the occurrence of an abnormal situation. On the other hand, the abnormality determination unit 112, if breathing has stopped and does not resume, determines that an abnormal situation in health of the user (communication terminal 100) has occurred.

This configuration allows reliably reporting an abnormal situation by the user's intention without the robber's awareness. For example, a user can, even in a situation where he/she is threatened by a threatener (robber) and cannot take any actions, report the abnormal situation to his/her family (other communication terminal(s) 100), the office and headquarters of the store and the security company 220 by a breathing stop pattern of his/her stopping breathing for a few seconds, without the threatener's awareness. The family or the like can make confirmation and call the emergency number 110 to a police 230 to prevent trouble or an incident. Also, similarly for an employee(s) of a cash transport truck, bus, taxi, precious metal, a jewelry counter, or the like, the safety of the employee can be ensured to protect him/her against a robbery case. Also, even for the aged, children, and those said to have health problems being socially vulnerable and even from a remote place, a support action for help can be provided in real time on the occurrence of an abnormal situation. As a result, the life and property of a corporation or individual employee (s) can be protected in real time, let alone a family, and the digital smart security system is useful as a system for countermeasures against crime, and its economic advantages and contribution are considerably great.★

For example, in the case where a robber intrudes into a building of service operations such as a store, bank, company office, station/air terminal, money exchanger, cash transport truck, bus, or taxi and an individual home, its employee can reliably report the abnormal situation by stopping breathing for only a fixed period of time and resuming breathing, and his/her family concerned can call the emergency number 110 to the police.

Also, when the respiration sensor 10 stops due to a threatener (robber)'s violence or the communication terminal 100 is robbed by a robber and signal communications between the respiration sensor 10 and the communication terminal 100 are not available, the communication terminal 100 transmits the current position identified by the GPS and that the user is in an emergency to the monitoring device 200, and the monitoring device 200 reports the same further to his/her corporate or family concerned person, which allows the corporate or family concerned person to call the emergency number 110 to the police. As above, even when in a situation where an employee(s) is threatened by a threatener and cannot take any actions, the monitoring device 200 is capable of reporting the abnormal situation to the headquarters office of the store and the security company 220 to allow calling the emergency number 110 to a police 230 in real time, without the threatener's awareness.

In the present embodiment, because a report is made preferentially to an information addressee that is in the same police administrative district as the victim, the person having received the report can promptly make an emergency call to the police of the police administrative district where the victim is.

(Second Embodiment)

A second embodiment of the present invention is an example of application to a user, cash transport truck, bus, taxi, or the like.

The digital smart security system according to the second embodiment of the present invention has the same hardware configuration as in FIG. 1, and therefore, description thereof will be omitted.

Next, a registration processing of the monitoring device 200 of the digital smart security system will be described.

Figure 11:
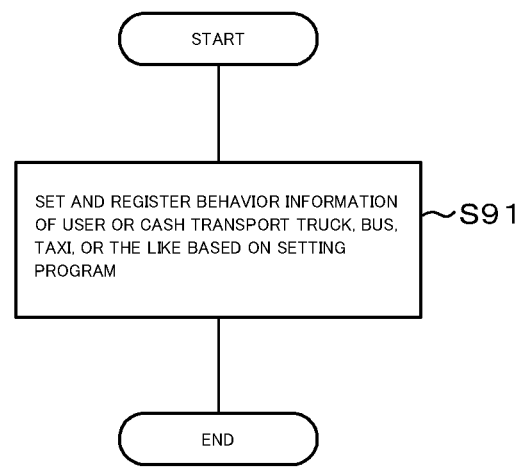
FIG. 11 is a flowchart showing a registration processing of the monitoring device of the digital smart security system according to the first embodiment of the present invention.

FIG. 11 is a flowchart showing a registration processing of the monitoring device 200 (FIG. 1). The present flow is executed mainly by the control unit 201 of the monitoring device 200.

In step S91, the control unit 201 registers behavior information of a user of a cash transport truck, bus, taxi, or the like, in advance, as monitoring device registration setting information (not shown). As the monitoring device registration setting information, user information of the respiration sensor 10 correlated with the communication terminal 100 such as the mobile phone number of the communication terminal, the name, a password, a contact address, and a normal respiratory rate (normal-time respiratory information) is registered. Also, a breathing stop pattern program is registered.

Figure 12:
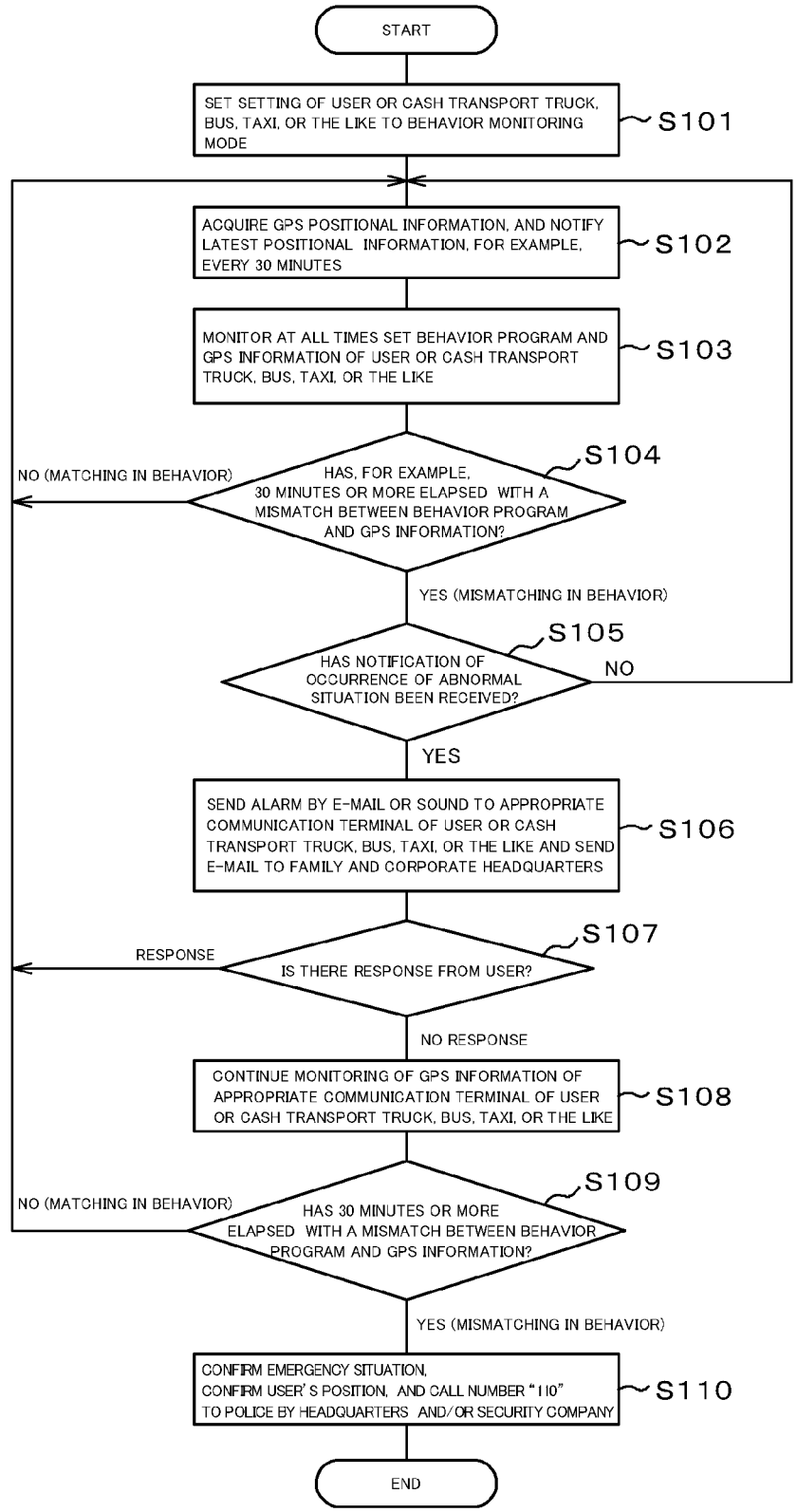
FIG. 12 is a flowchart showing a behavior monitoring control operation of a monitoring device of a digital smart security system according to a second embodiment of the present invention.

FIG. 12 is a flowchart showing a behavior monitoring control operation of the monitoring device 200 of the digital smart security system. The present flow is executed mainly by the control unit 201 (FIG. 1) of the monitoring device 200.

First, if the user is a user of a cash transport truck, bus, taxi, or the like, the control unit 201 sets the mode setting of the communication terminal 100 to a behavior monitoring mode in step S101. Also, the mode setting of the communication terminal 100 is also similarly set to a behavior monitoring mode. In this case, there may be a mode of the communication terminal 100 first being set to a behavior monitoring mode and reporting its behavior monitoring mode to the monitoring device 200, and the monitoring device 200 then setting a behavior monitoring mode.

In step S102, the control unit 201 acquires positional information of the communication terminal 100 transmitted from the communication terminal 100, for example, every 30 minutes. Here, it is preferable that notification of positional information by the GPS in the present embodiment is every predetermined time (for example, 30 minutes) shorter than the predetermined time (for example, one hour) of the first embodiment. That is, the user (communication terminal 100) of a cash transport truck, bus, taxi, or the like possibly moves in the vehicle, and it is considered that the positional information greatly changes in this case. It is therefore preferable to acquire positional information every time shorter than the predetermined time of the first embodiment. Also, positional information can be continuously acquired by an autonomous navigation system using a gyroscope etc., even when the communication terminal 100 is in a place where radio communication is not available such as the inside of a tunnel. Further, when the communication terminal 100 is thus in a place where radio communication is not available, the monitoring device 200 can no longer receive the position of the communication terminal 100, but an erroneous report can be prevented, when it is assumed that the communication terminal 100 is in an area where radio communication is not available on a map, by judging that even a failure in acquiring positional information is not abnormality.

In step S103, the control unit 201 monitors a set behavior program and positional information of the user of a cash transport truck, bus, taxi, or the like at all times (here, monitors every 30 minutes).

In step S104, the control unit 201 determines whether a predetermined time (for example, 30 minutes or more) has elapsed with a mismatch between the set behavior program and the positional information by the GPS of the user of a cash transport truck, bus, taxi, or the like.

If the predetermined time has not elapsed with a mismatch between the set behavior program and the positional information by the GPS, it is judged that the set behavior program and the positional information are matching in behavior to return to the above-described step S102. If the predetermined time has elapsed with a mismatch between the set behavior program and the positional information by the GPS, it is judged there is a mismatch in behavior between the set behavior program and the positional information to proceed to step S105.

In step S105, it is determined whether notification of the occurrence of an abnormal situation from the user (communication terminal 100) of a cash transport truck, bus, taxi, or the like has been received. In addition, the determination of an abnormal situation has been described according to FIG. 5.

If notification of the occurrence of an abnormal situation has been received, the control unit 201 sends an alarm by an e-mail message or sound to the user's communication terminal 100 via the alarm sending unit 203 (FIG. 1) in step S106, and transmits an e-mail message to the user's family, corporate headquarters, and the like. If notification of the occurrence of an abnormal situation has not been received, the control unit 201 returns to the above-described step S102.

In step S107, the control unit 201 determines whether there is a response from the user's communication terminal 100.

If there is a response from the user's communication terminal 100, the control unit 201 returns to the above-described step S102. On the other hand, if there is no response from the user's communication terminal 100, the control unit 201 continues monitoring of the positional information by the GPS of the user's communication terminal 100 in step S108.

In step S109, the control unit 201 determines whether a predetermined time (for example, 30 minutes or more) has elapsed with a mismatch in behavior between the set behavior program and the positional information.

If the predetermined time has not elapsed with a mismatch between the set behavior program and the positional information by the GPS, it is judged that the set behavior program and the positional information are matching in behavior to return to the above-described step S102. If the predetermined time has elapsed with a mismatch between the set behavior program and the positional information by the GPS, it is judged there is a mismatch in behavior between the set behavior program and the positional information to proceed to step S110.

In step S110, the control unit 201, by the headquarters and/or security company, confirms the emergency situation, confirms the user's position, and calls the emergency number 110 to the police to end the present flow.

Here, as an example of a reporting method, as in the first embodiment, a report may be made preferentially to an information addressee that is in the same police administrative district as the victim.

As above, according to the present embodiment, even when a threatener (robber) attacks a cash transport truck, bus, taxi, or the like and threatens its employee and the employee is restrained and cannot take any actions or call for help, the employee can reliably report the occurrence of an abnormal situation together with current positional information. Also, even when the headquarters contacts the employee by telephone if there is any abnormality and hears from the employee that he/she is safe, the headquarters can call the emergency number 110 to the police if the behavior of the cash transport truck, bus, taxi, or the like confirmed by the GPS is not of behaving along a prescribed course, so that an incident can be prevented. Further, a moving image or photo(s) of a surveillance camera installed inside the vehicle of the cash transport truck, bus, taxi, or the like is transmitted by e-mail to a concerned person at the corporate headquarters to convey the abnormal state of the cash transport truck, bus, taxi, or the like. The concerned person at the corporate headquarters having received the e-mail confirms the situation inside the vehicle, and if it is an emergency situation, calls the emergency number 110 to the police, and is thereafter capable of responding thereto by tracking the cash transfer truck, bus, taxi, or the like by the GPS and mobile terminal.

(Third Embodiment)

In the above-described respective embodiments, a description has been given of the example of instructing in advance so as to stop breathing for only a certain period of time and resume breathing in the case of the occurrence of an abnormal situation, and if it has been judged that the personnel has stopped breathing for the predetermined period of time (for example, for 10 to 15 seconds) and resumed breathing, judging that an abnormal situation has occurred to make a report.

The third embodiment of the present embodiment is an example of another breathing stop pattern.

The digital smart security system according to the present embodiment has the same hardware configuration as in FIG. 1, and therefore, description thereof will be omitted. In the present embodiment, the storage unit 104 of FIG. 1 stores a breathing stop pattern shown in FIG. 13.

FIG. 13 is a chart showing an example of a breathing stop pattern of the digital smart security system according to the present embodiment.

As shown in FIG. 13, each user has normal respiration, abnormal states, periods to intentionally stop breathing (periods set by individual), a breathing stop pattern, and an emergency situation as the breathing stop pattern of the present invention.

For example, user A sets the time to stop breathing and the following number of times, according to the personal level, as a pattern of a period of approximately 5 seconds out of 30 seconds for a "i. Attention state," a period of 10 seconds for a "ii. Abnormal state," and a period of 15 seconds for a "iii. Emergency state." The breathing stop pattern is created by repeating the above-described "i," "ii," or "iii" one time or two to three times at intervals set depending on the on-site situation. Also, it is preferable to create breathing stop pattern programs by user's industry and/or by categories of children, minors, adults, and the aged.

As above, according to the present embodiment, storing in advance user-by-user breathing stop patterns allows automatically identifying the occurrence of an abnormal state, in the case of the occurrence of an abnormal state, without the user performing an operation of stopping breathing for only a predetermined period of time and resuming breathing.

The above description is an exemplification of preferred embodiments of the present invention, and the scope of the present invention is not limited thereto. For example, in the present embodiment, a description has been given of the case of using the telephone line 210 as a public line, but the present invention is not limited to this case, and for example, a radio communication line, the Internet, or a LAN may be used as a public line. Moreover, the communication terminal may be used according to the type of the public line, such as a transceiver used as a communication terminal when the public line is radio communication, and a personal computer or a palmtop computer used as a communication terminal when the public line is the Internet or a LAN. Thus constructing a digital smart security system using an existing public line allows expanding the usage form of a digital smart security system and allows suppressing the construction costs of a digital smart security system.

Moreover, the title of a digital smart security system and method has been used in the present embodiment, but this is for convenience of description, and the title may be digital smart security, a crime-prevention system, a security method, or the like.

Further, detection of an abnormal situation covers all of publicly-known matters. Examples of the abnormal situation are intrusion or approach of a suspicious person(s). Also, the report may be any, without being limited to an e-mail message.

Also, a digital smart security system and method of the present invention can also be realized by a program to operate a computer as the present digital smart security system or method. This program may be stored in a storage medium that can be read by a computer.

This storage medium recorded with the program may be a ROM itself of the present digital smart security system, or may be a storage medium such as a CD-ROM that can be read, when a program reading device such as a CD-ROM drive is provided as an external storage device, by inserting therein the storage medium.

Moreover, the above-described storage medium may be a magnetic tape, a cassette tape, a flexible disk, a hard disk, an MO/MD/DVD or the like, or a semiconductor memory.

All publications, patents and patent applications cited in the present specification are hereby incorporated by reference in their entirety.

INDUSTRIAL APPLICABILITY

The digital smart security system and method according to the present invention provide real-time responses in corporate and commercial facilities, offices, and the like to prevent losses of property and life and economic losses, whereby providing great utilization effects.

REFERENCE SIGNS LIST

10 Respiration sensor
100 Communication terminal
101 Respiratory information acquisition unit
102 GPS function unit
103 Communication unit
104 Storage unit
110, 201 Control unit
111 Registration unit
112 Abnormality determination unit
200 Monitoring device
201 Control unit
202 Input unit
203 Alarm sending unit
210 Telephone line
220 Security company

The invention claimed is:

1. A digital smart security system comprising:
a first communication terminal of a plurality of communication terminals, the first communication terminal comprising a respiratory information acquiring means for acquiring respiratory information from a respiration sensor that is configured to detect breathing of a person to which the respiration sensor is fitted;
an abnormality determining means for determining, based on the respiratory information, that a security abnormality exists when the person does not breathe for a predetermined period of time and resumes, determining that a health abnormality of the person exists when the person does not breathe and does not resume, and determining that neither the security abnormality nor the health abnormality exists otherwise; and
a control means for reporting different abnormal situations between the security abnormality and the health abnormality by the abnormality determining means, and reporting the security abnormality, without awareness of a suspicious person;
a positional information acquiring means for detecting existing positions of the plurality of communication terminals, and acquiring positional information of the plurality of communication terminals; and
jurisdiction retaining means for retaining information pertaining to a jurisdictional district for receiving an emergency telephone call where a building under security exists, wherein
the control means refers to the jurisdiction retaining means in response to the first communication terminal being in the jurisdiction district and the abnormality determining means having determined that it is an abnormal situation indicative of the security abnormality has occurred, and when any other of the plurality of communication terminals exists in the jurisdictional district, the control means reports preferentially to the other communication terminals, existing in the jurisdictional district.

2. The digital smart security system according to claim 1, wherein the abnormality determining means determines that it is different abnormality, based on the respiratory information, in response to which period of a plurality of predetermined periods the breathing stops and resumes, and the control means makes a different report in response to the different abnormality.

3. The digital smart security system according to claim 1, wherein the reporting means transmits an e-mail message and an image.

4. A digital smart security method comprising:
a respiratory information acquiring step of acquiring, by a respiratory information acquiring means of a first communication terminal of plurality of communication terminals, respiratory information from a respiration sensor that is configured to detect breathing of a person to which the respiration sensor is fitted;
an abnormality determining step of determining, by an abnormality determining means based on the respiratory information, that a security abnormality exists when the person does not breathe for a predetermined period of time and resumes, determining that a health abnormality of the person exists when person does not breathes and does not resume, and determining that neither the security abnormality nor the health abnormality exists otherwise; and
a control step of reporting, by a control means, different abnormal situations between the security abnormality and health abnormality by the abnormality determining step, and reporting the security abnormality, without awareness of the suspicious person;
a positional detecting step, by a positional information acquiring means, for acquiring positional information of the plurality of communication terminals; and
a retaining step for retaining, into a jurisdiction retaining means, information pertaining to a jurisdiction district for receiving an emergency telephone call where a building under security exists, wherein
the control means refers to the jurisdiction retaining means in response to the first communication terminal being in the jurisdiction district and the abnormality determining means having determined that it is an abnormal situation indicative of the security abnormality, and when any other of the plurality of communication terminals exists in the jurisdictional district, the control means reports preferentially to the other communication terminals, existing in the jurisdictional district.

5. A tangible non-transitory computer-readable storage medium having a program stored therein, wherein the program configures a computer to perform as the digital smart security system according to claim 1.

* * * * *